July 10, 1962 C. H. HERR, JR 3,043,158
MEANS FOR MAINTAINING A PAIR OF MATING GEARS IN MESH
Filed July 15, 1960

Inventor
Charles H. Herr, Jr.
By Charles L. Schwab
Attorney

United States Patent Office 3,043,158
Patented July 10, 1962

3,043,158
MEANS FOR MAINTAINING A PAIR OF
MATING GEARS IN MESH
Charles H. Herr, Jr., Springfield, Ill., assignor to Allis-Chalmers Manufacturing Company, Milwaukee, Wis.
Filed July 15, 1960, Ser. No. 43,030
3 Claims. (Cl. 74—462)

This invention relates to power transmission gearing and more particularly to means for maintaining a shiftable gear in mesh with its mating gear.

Heretofore it has been common practice to provide a detent on the shift rod employed to shift the shiftable gear which affords sufficient resistance to axial shifting of the shift rod to prevent the shifted gear from coming out of mesh with its complementary mating gear. However, in some gearing arrangements providing a detent which exerts sufficient biasing pressure on the shift rod to prevent shifting produces a gear shift control which renders shifting gears too difficult to achieve through manually controlled linkage.

It is an object of this invention to provide means for preventing an axially shifted gear from coming out of mesh with its mating gear.

It is a further object of this invention to provide means for preventing an axially shifted gear from coming out of mesh with its mating gear wherein the cooperation of the teeth of the two meshing gears produces a biasing action which maintains the shiftable gear in mesh.

It is a further object of this invention to provide teeth on a pair of meshable gears of such construction that the shiftable gear is urged by coaction of the teeth in the direction toward engagement.

It is a further object of this invention to provide teeth on a pair of relative rotating gears which taper in opposite axial directions wherein one of said gears is shiftable from a nonmeshing position to a meshing position and the coaction of the teeth urges the shiftable gear toward its meshing position.

It is a further object of this invention to provide mechanism as hereinbefore described which may be manufactured with conventional straight spur gear cutting tools.

Other objects and advantages of the present invention will be readily apparent to those skilled in the art when the following detailed description is read in conjunction with the appended drawings in which.

Figure 1:
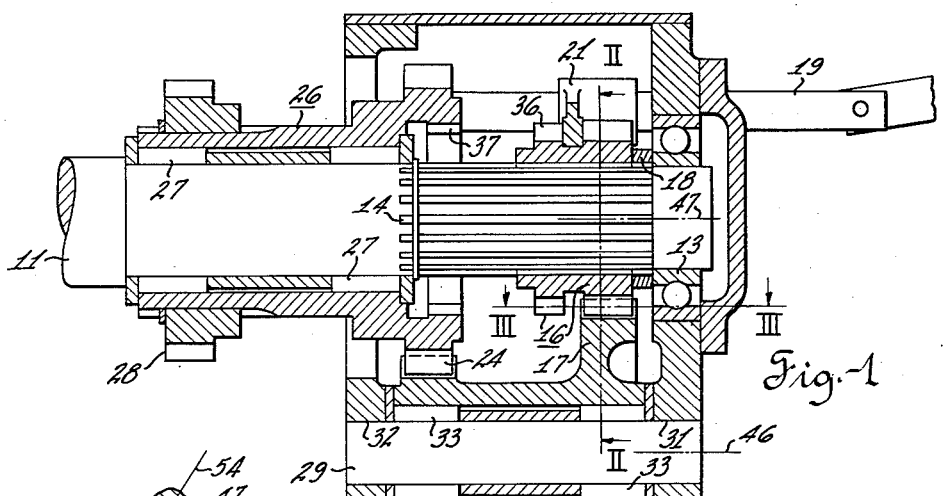
FIG. 1 is a section through a transmission in which the present invention is incorporated.

Referring to FIG. 1, a section view of a two speed transmission is shown. A drive shaft 11 is rotatably journaled in a transmission housing 12 on an axis 47 by a bearing 13. The drive shaft 11 has a splined portion 14 on which an internally splined spur gear 16 is axially shiftable from neutral to operative positions. In its illustrated position in FIG. 1 gear 16 is shown shifted in one axial direction, to the right, into its meshing position wherein it is in meshing engagement with a mating spur gear 17. An abutment in the form of a washer 18 is carried by the shaft which prevents the first gear 16 from being shifted to the right beyond its desired meshing position.

The first spur gear 16 is shifted by the operator through conventional gear shifting mechanism including a shift rod 19 which carries a shifter fork 21.

In the condition of the transmission illustrated in FIG. 1, power is transmitted through the drive shaft 11 to the first gear 16 thence to the second gear 17 which is a part of gear cluster 22 on which a spur gear 23 is also formed. The gear cluster 22 is rotatably mounted by a pair of bearings 33 on a stationary shaft 29 which is press fitted into a pair of openings 31 and 32 in the housing. Power from the gear cluster 22 is transmitted by gear 23 to a constantly meshing gear 24. Gear 24 is a part of a second gear cluster 26 which is journaled by bearings 27 on drive shaft 11. The cluster 26 includes an output gear 28 secured through a spline connection with the body of the gear cluster 26.

When the first gear 16 is shifted to the left so that its clutch teeth 36 mesh with the internal clutch teeth 37 of gear 24, power is transmitted from the drive shaft 11 through the clutching portion of gear 16 to gear 24 and thence to the output gear 28. When the gear 16 is shifted to a position intermediate its clutching position and its meshing position with gear 17, the transmission is in neutral.

Thus it is seen that the first gear 16 is axially shiftable on the drive shaft 11, with which it is nonrotatably secured, between a first nonmeshing position and a second meshing position.

Figure 3:
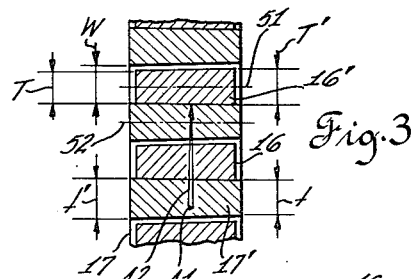
FIG. 3 is a section taken along the line III—III of FIG. 1.

Referring to FIG. 3, it is seen that the teeth of gear 16 taper in thickness from a dimension T to an increased width measured in thickness T'. The teeth of gear 17 taper from a thickness $t$ at their right end to an increased thickness $t'$ at their axially opposite end. The teeth on both gears 16 and 17 taper to increasing thickness in opposite directions away from their axially extending center lines 51, 52, respectively. The axial component 41 of the tooth load, illustrated by vector 42, on gear tooth 16' of gear 16 urges the gear tooth 16', and consequently the gear 16, to the right against abutment 18.

By way of example of a construction of a pair of gears utilizing the present invention, the gear 16 may have a pitch diameter 54 of 2.6667 inches and have sixteen teeth which taper from a circular thickness of .2443 inch at T to an increased thickness of .2543 inch at T'. Tooth 17' of gear 17 may have a pitch diameter 56 of 4.5000 inches and have twenty-seven teeth which taper from a circular thickness of .2493 inch at $t$ to a circular thickness $t'$ of .2593 inch.

Sufficient backlash is provided in the gears to permit the thick portion of tooth 16' to clear the narrowest spacing between the teeth 17'. In other words, the dimension W is greater than T', thus permitting axial disengagement of gear 16 from gear 17 in an axial direction to the left as viewed in FIGS. 1 and 3.

Figure 2:
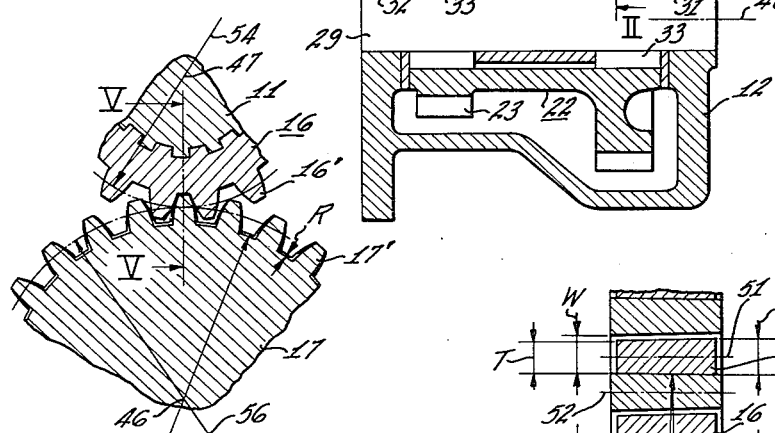
FIG. 2 is a partial section taken along the line II—II of FIG. 1.
Figure 4:
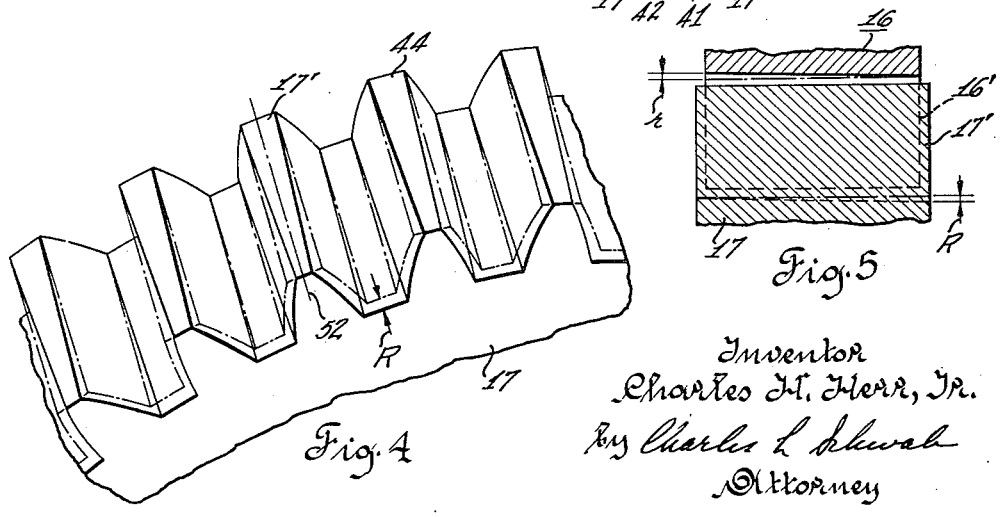
FIG. 4 is a perspective view of a portion of a gear manufactured in accordance with the present invention.
Figure 5:
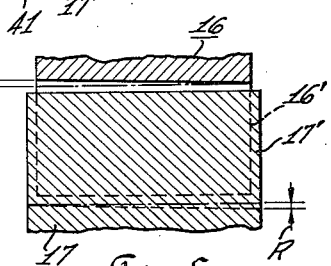
FIG. 5 is a section taken along the lines V—V of FIG. 2.

Referring also to FIGS. 4 and 5, the tapered teeth 17' are formed on a cylindrical blank by changing the distance between a conventional spur tooth gear hob, not shown, and the gear center 46 as the hob is cutting across the face of the gear. When the teeth are cut on the gear 17 the tips 44 of the teeth 17' will taper as shown in solid lines. The dot-dash lines show the form of a conventional straight, spur tooth gear and the solid lines show the form of gear 17 manufactured by the teachings of this invention. The hob to gear center distance is reduced as the hob cuts across the face of the gear tooth from top to bottom as illustrated in FIG. 4 to taper both sides of teeth 17' to decreasing circular thickness at the pitch diameter 56. Thus the root diameter 57 of the gear 17 decreases from left to right as illustrated in FIG. 5. This decrease in root diameter is shown in FIGS. 2, 4 and 5 to be a distance R. The tooth form illustrated is involute. The teeth 16' are formed on gear 16 in the same manner as teeth 17' are formed on gear 17. As illustrated, the root of gear 16 tapers a distance $r$ from right to left as viewed in FIG. 5, this taper being measured from a line parallel to the gear axis 47. It should be understood that this taper is not carried through into the clutch teeth 36 which are straight.

It should be understood that it is not intended to limit the invention to the particular forms and details described hereinabove and that the invention includes such other forms and modifications as are embraced by the scope of the appended claims.

What is claimed is:

1. In a transmission including a housing, a power transmitting shaft journaled in said housing on a first axis of rotation, a first gear nonrotatably mounted on said shaft in axially slidable relation thereto, a second gear, means rotatably supporting said second gear in said housing on a second axis parallel to said first axis and means for axially shifting said first gear in one direction from a nonmeshing position to a meshing position in which power is transmitted from one of said gears to the other of said gears, the combination comprising: a first set of external teeth formed on said first gear tapering axially in said one direction; a second set of external teeth formed on said second gear tapering axially in the direction opposite to said one direction; and an abutment carried on said shaft for preventing shifting of said first gear in said one direction beyond said meshing position, the axial component of the tangential tooth load on said teeth of said first gear urging the latter in said one direction thereby maintaining said first gear in mesh with said second gear and the backlash between said teeth being sufficient to permit said first gear to be shifted into and out of mesh with said second gear.

2. The structure set forth in claim 1 wherein the root of said first gear tapers outwardly in said one direction to an increased root diameter and wherein the root of said second gear tapers outwardly in said opposite direction to an increased root diameter.

3. In a transmission including a housing, a power transmitting shaft journaled in said housing on a first axis of rotation, a first gear nonrotatably mounted on said shaft in axially slidable relation thereto, a second gear, means rotatably supporting said second gear in said housing on a second axis parallel to said first axis and means for axially shifting said first gear in one direction from a nonmeshing position to a meshing position in which power is transmitted from one of said gears to the other of said gears, the combination comprising: a first set of external teeth formed on said first gear with circumferentially opposite sides divergingly tapering axially in said one direction; a second set of external teeth formed on said second gear with circumferentially opposite sides divergingly tapering axially in the direction opposite to said one direction; and an abutment carried on said shaft for preventing shifting of said first gear in said one direction beyond said meshing position, the axial component of the tangential tooth load on one of said sides of said teeth of said first gear urging the latter in said one direction thereby maintaining said first gear in mesh with said second gear and the backlash between said teeth being sufficient to permit said first gear to be shifted into and out of mesh with said second gear.

References Cited in the file of this patent

UNITED STATES PATENTS

| | | |
|---|---|---|
| 79,605 | Sibley | July 7, 1868 |
| 1,704,890 | Gerson | Mar. 12, 1929 |
| 1,773,996 | Gordon | Aug. 26, 1930 |
| 1,935,965 | Wahlberg | Nov. 21, 1933 |
| 2,085,019 | Griswold | June 29, 1937 |
| 2,128,815 | Guest | Aug. 30, 1938 |
| 2,320,757 | Sinclair et al. | June 1, 1943 |
| 2,321,255 | Schultz et al. | June 8, 1943 |
| 2,422,326 | Wildhaber | June 17, 1947 |